`US012130477B2`

(12) United States Patent
Claver et al.

(10) Patent No.: US 12,130,477 B2
(45) Date of Patent: Oct. 29, 2024

(54) CABLE MARKING CLIP

(71) Applicant: PPC BROADBAND, INC., East Syracuse, NY (US)

(72) Inventors: Nicholas Claver, Liverpool, NY (US); Noah Montena, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 17/990,426

(22) Filed: Nov. 18, 2022

(65) Prior Publication Data

US 2023/0152526 A1 May 18, 2023

Related U.S. Application Data

(60) Provisional application No. 63/264,251, filed on Nov. 18, 2021.

(51) Int. Cl.
*G02B 6/36* (2006.01)
*G02B 6/38* (2006.01)
*G02B 6/44* (2006.01)

(52) U.S. Cl.
CPC ......... *G02B 6/3632* (2013.01); *G02B 6/3879* (2013.01); *G02B 6/3887* (2013.01); *G02B 6/4482* (2013.01)

(58) Field of Classification Search
CPC .. G02B 6/3879; G02B 6/3632; G02B 6/4482; G02B 6/3887; H01R 13/465
See application file for complete search history.

(56) References Cited

U.S. PATENT DOCUMENTS

| | | | | |
|---|---|---|---|---|
| 5,640,476 A | * | 6/1997 | Womack | G02B 6/4478 385/86 |
| 6,356,696 B1 | * | 3/2002 | Bakker | G02B 6/4461 385/134 |
| 6,554,489 B2 | * | 4/2003 | Kent | G02B 6/3829 385/136 |
| 6,873,779 B1 | * | 3/2005 | Sonderegger | G02B 6/4478 385/136 |
| 8,585,096 B2 | * | 11/2013 | Schnell | F16L 15/08 604/905 |
| 10,444,459 B2 | * | 10/2019 | Haataja | G02B 6/3873 |

(Continued)

FOREIGN PATENT DOCUMENTS

WO   WO-2016162377 A1 * 10/2016

OTHER PUBLICATIONS

International Search Report and Written Opinion dated Mar. 7, 2023 in corresponding International Application No. PCT/US2022/050342, 14 pages.

*Primary Examiner* — Ryan A Lepisto
*Assistant Examiner* — Erin D Chiem
(74) *Attorney, Agent, or Firm* — MH2 TECHNOLOGY LAW GROUP LLP (57) ABSTRACT

A cable marking clip for securing to a connector of a cable such that axial movement of the cable marking clip relative to the connector is prevented includes an outer portion; and an inner portion attached to the outer portion at an end. The outer portion is configured to engage a connector having strain relief grooves and the inner portion is configured to be received radially between the connector and a cable so as to prevent axial movement of the cable marking clip relative to connectors with and without strain relief grooves.

30 Claims, 4 Drawing Sheets

(56) References Cited

U.S. PATENT DOCUMENTS

| | | | |
|---|---|---|---|
| 2003/0236020 A1* | 12/2003 | Iamartino | H01R 9/03 |
| | | | 439/445 |
| 2010/0322578 A1* | 12/2010 | Cooke | G02B 6/4471 |
| | | | 385/135 |
| 2018/0286289 A1* | 10/2018 | Liversidge | H01R 13/465 |
| 2019/0377139 A1 | 12/2019 | Chang et al. | |
| 2020/0064564 A1 | 2/2020 | Ho et al. | |
| 2020/0379192 A1 | 12/2020 | Ho et al. | |
| 2020/0408350 A1* | 12/2020 | Walterspiel | F16L 58/185 |

\* cited by examiner

CABLE MARKING CLIP

CROSS-REFERENCE TO RELATED APPLICATION

This application claims the benefit of U.S. Provisional Application No. 63/264,251 filed Nov. 18, 2021, the disclosure of which is hereby incorporated by reference herein in its entirety.

TECHNICAL FIELD

The present disclosure generally relates to the identification of cables and wires, and more particularly, to an identification system for easily and properly securing identifying indicia to small diameter fiber optic cables.

BACKGROUND

A variety of methods of identifying wires and cables are known in the art. Existing methods for identifying wires and cables include self-laminated adhesive labels, tape markers, clip-on wire markers and slip-on wire markers. Various disadvantages still exist in prior cable identification methods, especially in applications utilizing small diameter fiber optic cables which can be easily damaged. For example, self-laminated adhesive labels are difficult to apply to small diameter fiber optic cables and the surface area provided to properly identify and include sufficient information is a drawback. Also, sleeve-type marker clips can only be installed prior to termination of both ends of a fiber optic cable, and they can also cause damage to the cable if they are crimped in a fixed position on the cable. Moreover, clip-on markers either are designed to be fixedly secured to a fiber optic cable and, thus, are likely to damage the cable upon application, or the markers are so loosely applied to the cable that the identifying indicia is not in a fixed position along the cable.

It may be desirable to provide a cable identification system in which an outer wall includes a recess that is configured to receive the protrusion of a second one of the cable marking clip so as to enable stacking of cable marking clips.

It may be desirable to provide a cable identification system in which the protrusion is configured to engage a recess on a connector having strain relief grooves and an inner sleeve is configured to be received radially between the connector and a cable so as to prevent axial movement of the cable marking clip relative to connectors with and without strain relief grooves.

It may be desirable to provide a cable identification system that allows identifying indicia to be applied to small diameter fiber optic cables without damaging the cables.

It may be desirable to provide a cable identification system that easily and properly secures identifying indicia to small diameter fiber optic cables, while still allowing the identifying indicia to be readily viewable.

SUMMARY

According to various exemplary aspects of the present disclosure, a cable marking clip includes an open outer cylindrical wall and an open inner sleeve. The open inner sleeve may be integral to the open outer cylindrical wall at a proximate end of the open inner sleeve and the open outer cylindrical wall. The open inner sleeve may be configured to be positioned substantially circumferentially around a portion of a fiber optic cable.

The open inner sleeve may optionally be configured to be at least partially disposed between a boot and a cable in order to secure the cable marking clip to the cable and the boot. Alternatively, at least one interior tab defined on an interior surface of the open outer cylindrical wall may be configured to be disposed in a recess defined by a boot in order to secure the cable marking clip to the cable and the boot.

The cable marking clip may further include a lateral gap that is defined between a portion of the open outer cylindrical wall and a portion of the open inner sleeve. The open outer cylindrical wall and the open inner sleeve may each include a pair of opposed flexible arm regions that are configured to flex and expand an opening between each pair of opposed flexible arm regions to enable the portion of the fiber optic cable to be seated within the open inner sleeve.

The open outer cylindrical wall may define at least one interior tab on an inner surface of the open outer cylindrical wall. The open outer cylindrical wall may also define at least one aperture that is configured to receive a mating interior tab defined on an adjacent stacked clip. In embodiments, each cable marking clip is dyed to have a particular color. When cable marking clips are stacked onto each other, a cable marking clip may be dyed to have a first color and the adjacent stacked clip may be dyed to have a second color which is different from the first color. However, it is also understood that the cable marking clip and the adjacent stacked clip may each be dyed to have the same color such that a first cable may have two cable marking clips with the same color and a second cable may have two cable marking clips with a different color combination.

According to various aspects of the present disclosure, a cable identification system may include a communications cable, a boot, and a marking clip. The boot may be affixed to an end of the communications cable. The marking clip may be affixed to at least the boot. The marking clip may include an open outer cylindrical wall and an open inner sleeve integral to the open outer cylindrical wall at a proximate end of the open inner sleeve and the open outer cylindrical sleeve. The open inner sleeve may be configured to be positioned substantially circumferentially around a portion of a fiber optic cable.

Similarly, in the cable identification system, a lateral gap may be defined between a portion of the open outer cylindrical wall and a portion of the open inner sleeve. The open outer cylindrical wall and the open inner sleeve each include a pair opposed flexible arm regions that are configured to flex and expand an opening between each pair of opposed flexible arm regions to enable the portion of the fiber optic cable to be seated within the open inner sleeve.

The internal sleeve may optionally be configured to be at least partially disposed between a boot and a cable in order to secure the cable marking clip to the cable and the boot. Alternatively, at least one interior tab defined on an interior surface of the open outer cylindrical wall may be configured to be disposed in a recess defined by a boot in order to secure the cable marking clip to the cable and the boot.

The open outer cylindrical wall may define at least one interior tab on an inner surface of the open outer cylindrical wall. The open outer cylindrical wall may also define at least one aperture that is configured to receive a mating interior tab defined on an adjacent stacked clip. Each cable marking clip is dyed to have a particular color. When cable marking clips are stacked onto each other, a cable marking clip may be dyed to have a first color and the adjacent stacked clip may be dyed to have a second color which is different from the first color. However, it is also understood that the cable marking clip and the adjacent stacked clip may each be dyed to have the same color such that a first cable may have two cable marking clips with the same color and a second cable may have two cable marking clips with a different color combination.

According to various embodiments of the disclosure, a cable marking clip for securing to a connector portion of a cable such that axial movement of the cable marking clip relative to the connector portion is prevented includes: an outer wall including a first end; and an inner sleeve including a first end. The first end of the inner sleeve is attached to the first end of the outer wall; the inner sleeve is positioned radially inside the outer wall; the inner sleeve is configured to extend an axial length from its first end; the outer wall is configured to extend an axial length from its first end; the axial length of the inner sleeve is less than the axial length of the outer wall; the outer wall is configured to include an opening that extends an entirety of the axial length of the outer wall; the inner sleeve is configured to include an opening that extends an entirety of the axial length of the inner sleeve; the opening in the outer wall is configured to permit the outer wall to expand to receive a cable in a radial direction; the opening in the inner sleeve is configured to permit the inner sleeve to expand to receive the cable in the radial direction; the outer wall includes a protrusion that protrudes radially inward; the outer wall includes a recess that is configured to receive the protrusion of a second one of the cable marking clip so as to enable stacking of cable marking clips; and the protrusion is configured to engage a recess on a connector having strain relief grooves and the inner sleeve is configured to be received radially between the connector and a cable so as to prevent axial movement of the cable marking clip relative to connectors with and without strain relief grooves.

According to various aspects of the above embodiments of the cable marking clip, the inner sleeve is configured to be positioned partially circumferentially around a portion of the cable.

According to various aspects of the above embodiments of the cable marking clip, the cable is a fiber optic cable.

According to various aspects of the above embodiments of the cable marking clip, an inner surface of the outer wall is configured to contact an outer surface of the connector.

According to various aspects of the above embodiments of the cable marking clip, the protrusion includes a plurality of protrusions.

According to various aspects of the above embodiments of the cable marking clip, the opening in the outer wall and the opening in the inner sleeve are configured to expand to allow the cable marking clip to be installed on the cable.

According to various aspects of the above embodiments of the cable marking clip, the outer wall and the inner sleeve are separated radially by a gap.

According to various embodiments of the disclosure, a cable marking clip for securing to a connector portion of a cable such that axial movement of the cable marking clip relative to the connector portion is prevented includes: an outer portion including a first end portion; and an inner portion including a first end portion. The first end portion of the inner portion is attached to the first end portion of the outer portion; the outer portion has an opening that extends an entirety of the axial length of the outer portion; the inner portion has an opening that extends an entirety of the axial length of the inner portion; and the outer portion is configured to engage a recess on a connector having strain relief grooves and the inner sleeve is configured to be received radially between the connector and a cable so as to prevent axial movement of the cable marking clip relative to connectors with and without strain relief grooves.

According to various aspects of the above embodiments of the cable marking clip, the inner portion is positioned radially inside the outer portion.

According to various aspects of the above embodiments of the cable marking clip, the inner portion is configured to extend an axial length from its first end portion.

According to various aspects of the above embodiments of the cable marking clip, the outer portion is configured to extend an axial length from its first end portion.

According to various aspects of the above embodiments of the cable marking clip, the axial length of the inner portion is less than the axial length of the outer portion.

According to various aspects of the above embodiments of the cable marking clip, the outer portion includes a protruding portion that protrudes radially inward.

According to various aspects of the above embodiments of the cable marking clip, the outer portion includes a receiving portion that is configured to receive the protruding portion of a second one of the cable marking clip.

According to various aspects of the above embodiments of the cable marking clip, the protruding portion is configured to engage a recess on the connector portion to prevent axial movement of the cable marking clip relative to the connector portion.

According to various aspects of the above embodiments of the cable marking clip, the inner portion is configured to be positioned between a cable and a connector portion connected to the cable.

According to various embodiments of the disclosure, a cable marking clip for securing to a connector of a cable such that axial movement of the cable marking clip relative to the connector is prevented includes: an outer portion; and an inner portion attached to the outer portion at an end. The outer portion is configured to engage a connector having strain relief grooves and the inner portion is configured to be received radially between the connector and a cable so as to prevent axial movement of the cable marking clip relative to connectors with and without strain relief grooves.

According to various aspects of the above embodiments of the cable marking clip, the inner portion is positioned radially inside the outer portion.

According to various aspects of the above embodiments of the cable marking clip, the inner portion is shorter in an axial direction than the outer portion.

According to various aspects of the above embodiments of the cable marking clip, the outer portion has an opening that extends an entirety of an axial length of the outer portion.

According to various aspects of the above embodiments of the cable marking clip, the inner portion has an opening that extends an entirety of an axial length of the inner portion.

According to various aspects of the above embodiments of the cable marking clip, the outer portion is an outer wall that extends in an axial direction.

According to various aspects of the above embodiments of the cable marking clip, the inner portion is an inner sleeve that extends in the axial direction.

According to various aspects of the above embodiments of the cable marking clip, the outer portion includes a protruding portion that protrudes radially inward.

According to various aspects of the above embodiments of the cable marking clip, the outer portion includes a receiving portion that is configured to receive the protruding portion of a second one of the cable marking clip.

According to various aspects of the above embodiments of the cable marking clip, the protruding portion is configured to engage a recess on the connector to prevent axial movement of the cable marking clip relative to the connector.

According to various aspects of the above embodiments of the cable marking clip, the inner portion is configured to be positioned between the cable and the connector.

According to various aspects of the above embodiments of the cable marking clip, the inner portion and the inner portion comprises a single monolithic structure of unitary construction.

BRIEF DESCRIPTION OF THE DRAWINGS

Further advantages and features of the present disclosure will become apparent from the following description and the accompanying drawings, to which reference is made. In which are shown.

DETAILED DESCRIPTION

Reference will now be made in detail to compositions, embodiments and methods of the present disclosure, which constitute the best modes of practicing the present disclosure presently known to the inventors. It is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Embodiments of the disclosure provide an outer portion configured to engage a connector having strain relief grooves and an inner portion configured to be received radially between the connector and a cable so as to prevent axial movement of the cable marking clip relative to connectors with and without strain relief grooves.

Figure 1:
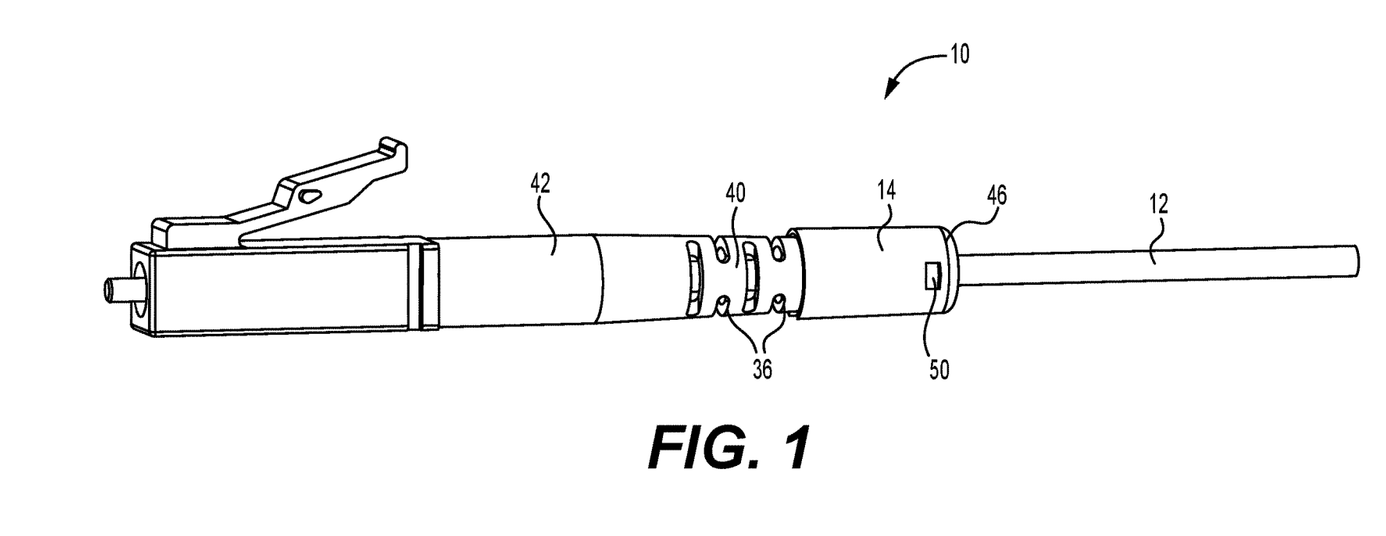
FIG. 1 is a perspective view of an exemplary first cable identification system in accordance with various aspects of the disclosure.
Figure 3:
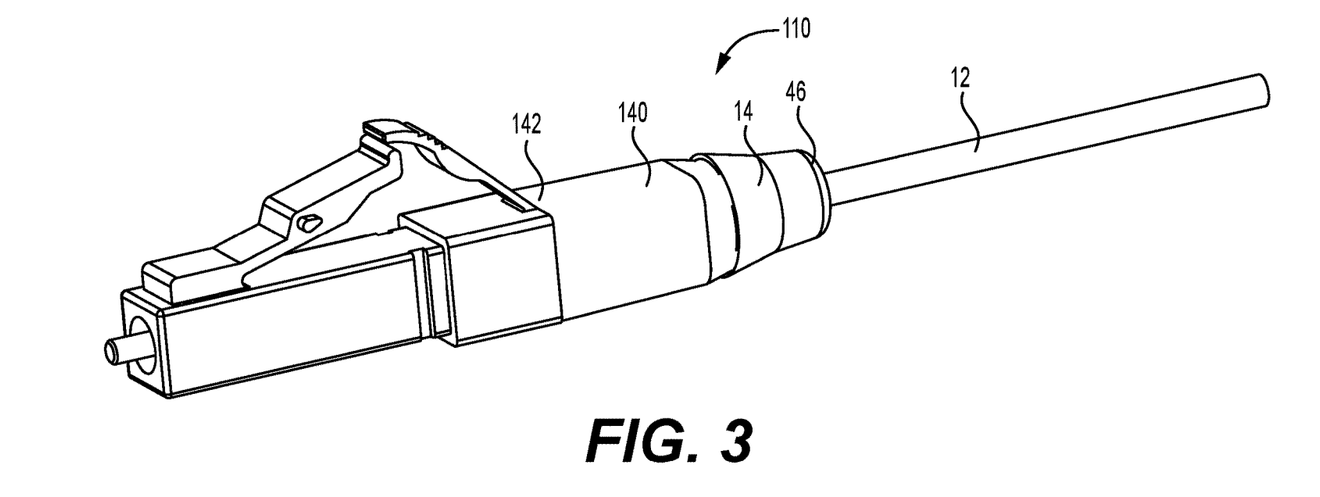
FIG. 3 is a perspective view of an exemplary second cable identification system in accordance with various aspects of the disclosure.

FIGS. 1 and 3 show perspective views of a cable identification system 10, 110 for securing identifying indicia to small diameter cables, such as a fiber optic cable 12. In some aspects, cable identification system 10 is secured to two millimeter or three millimeter fiber optic cables 12. However, it is likewise contemplated that cable identification system 10, 110 may be secured to fiber optic cables 12 of various sizes.

Figure 2:
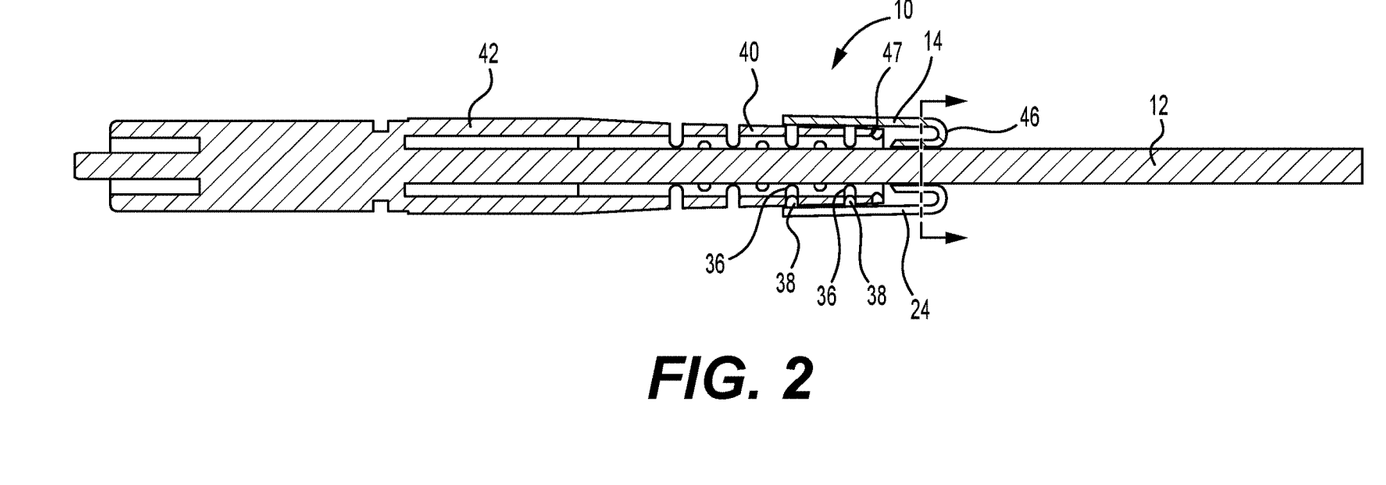
FIG. 2 is a sectional view of the cable identification system shown in FIG. 1.
Figure 5:
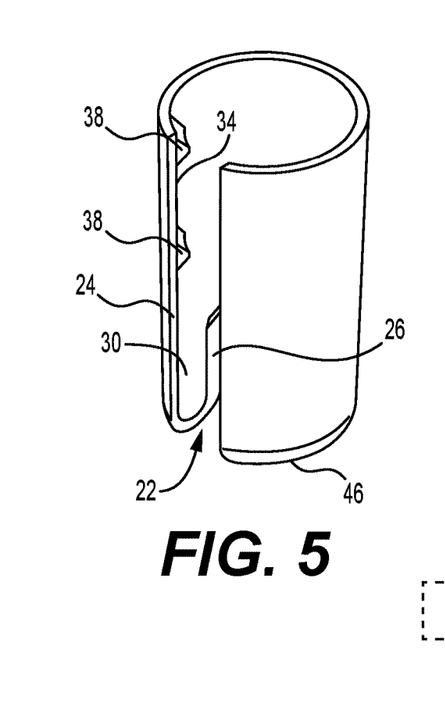
FIG. 5 is a perspective view of an exemplary marking clip in accordance with various aspects of the disclosure.
Figure 6:
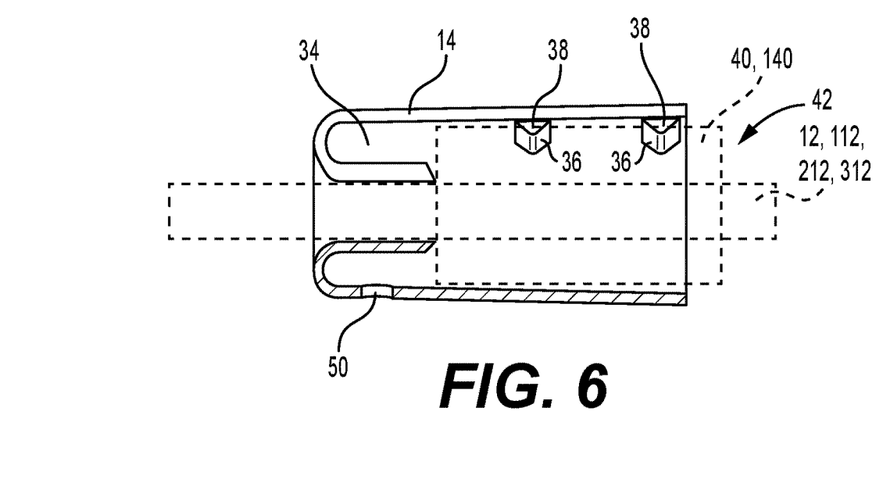
FIG. 6 is a sectional view of the marking clip shown in FIG. 5.

FIG. 2 shows a sectional view of cable identification system 10 in FIG. 1. In the example shown in FIGS. 1 and 2, the fiber optic cable 12 has a connector 42 attached thereto, and a strain relief member 40, for example, a boot, that is, in some embodiments, a part of the connector 42. As shown in FIGS. 1 and 2, the cable identification system 10 includes a marking clip 14 that is configured to be coupled with the fiber optic cable 12 and the connector 42 at a proximate end 47 of boot 40. Referring to FIG. 5, in this example, marking clip 14 has an outer receiving member 24, for example, a cylindrical wall, and an inner receiving member 26, for example, a sleeve, that extends parallel to outer cylindrical wall 24. In embodiments, one or more engagement structures 38, for example, protrusions or tabs, protrude radially inward from the outer cylindrical wall 24 of the marking clip 14. In embodiments, tabs 38 are configured to be received in one or more corresponding engagement features 36, for example, recesses or grooves, in the boot 40. In embodiments, inner sleeve 26 of marking clip 14 abuts proximate end 47 of boot 40. In embodiments, inner sleeve 26 of marking clip 14 may be proximate to, but not contact, proximate end 47 of boot 40. In embodiments, marking clip 14 is retained in position by one or more of tabs 38 engaging one or more recesses 36 in boot 40, as shown in FIGS. 2 and 6. Although it is not shown in FIG. 2, it is also understood that a portion of inner sleeve 26 of marking clip 14 may extend between boot 40 and cable 12.

Figure 4:
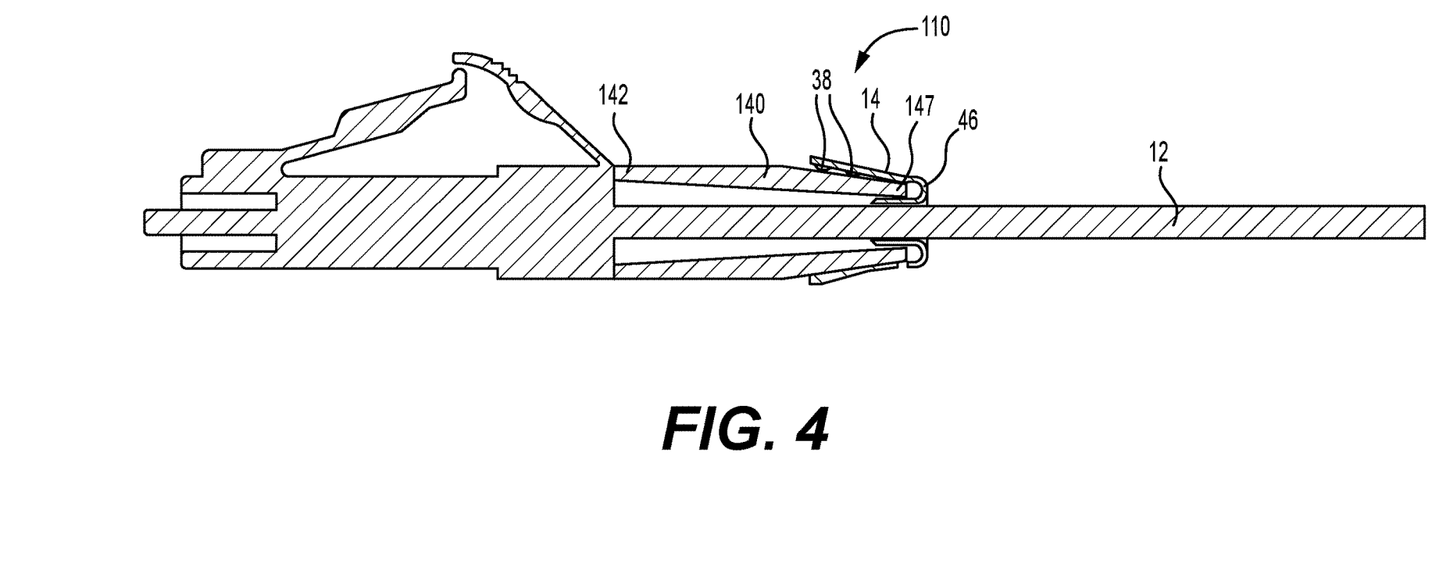
FIG. 4 is a sectional view of the cable identification system shown in FIG. 3.

FIG. 4 shows a sectional view of the cable identification system 110 in FIG. 3. In the example shown in FIGS. 3 and 4, fiber optic cable 12 has a connector 142 attached thereto, and a boot 140 that is, in some embodiments, a part of connector 142. As shown in FIGS. 3 and 4, in embodiments, marking clip 14 is configured to be mounted to fiber optic cable 12 and connector 142 at a proximate end 147 of boot 140. In the example shown in FIGS. 3 and 4, a portion of inner sleeve 26 of marking clip 14 may extend between boot 140 and cable 12. Some connectors/boots, such as boot 140, have smooth exterior surfaces, as opposed to the exterior surface of boot 40 that has recesses 36. In embodiments of cable identification system 110 shown in FIGS. 3 and 4, marking clip 14 does not have tabs 38 so that the contact between outer cylindrical wall 24 and an outer surface of boot 140 is more continuous. The absence of tabs 38 allows the entire inner surface of outer cylindrical wall 24 to contact the outer surface of boot 140. In such embodiments, marking clip 14 is retained by connector 142 and cable 12 by a pinching force exerted on a portion of inner sleeve 26 that is disposed between connector 142 and cable 12, as shown in FIG. 4.

FIG. 5 shows an example of marking clip 14 that includes outer cylinder wall 24 and inner sleeve 26 being attached at a proximate end 46 of marking clip 14. As shown, outer cylindrical wall 24 and inner sleeve 26 define an opening 22 which is configured to receive cable 12. Inner sleeve 26 is configured to fully secure a portion of cable 12 within marking clip 14 (see also FIG. 10). As shown in FIGS. 5 and 8-10, a lateral gap 30 is defined between inner sleeve 26 and a portion of outer cylindrical wall 24. As described above, in embodiments, marking clip 14 includes one or more tabs 38 disposed on an inside surface 34 of outer cylinder wall 24. Each tab 38 is configured to be received in a groove or other recess 36 in boot 40. In applications where the boot (such as boot 140) and/or the connector (such as connector 142) does not include a recess (as shown in FIGS. 3 and 4), each tab 38 may simply contact the outer surface of the boot or the connector when marking clip 14 is installed on cable 12 and connector/boot. In embodiments, marking clip 14 is made of a polymeric (or other) material which can expand as needed as shown in FIG. 4.

Figure 7:
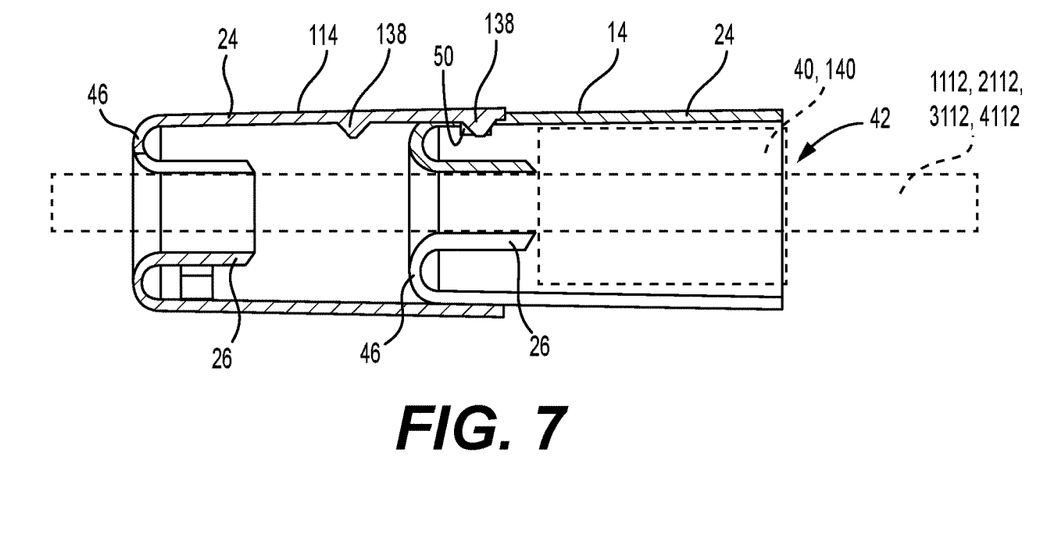
FIG. 7 is a sectional view of two of the marking clips shown in FIG. 5 in a stacked position.

In embodiments, marking clip 14 is configured to allow one marking clip 14 to be installed partially over another marking clip 14. Such an arrangement expands the number of different marking indications that can be provided by marking clip 14. For example, a red marking clip 14 installed with and partially covering a blue marking clip 14 can indicate one cable 12 while just a red marking clip 14 can indicate a different cable. To facilitate securely mounting two or more marking clips 14 on one end of a cable 12, embodiments include one or more recesses/openings 50 in outer cylindrical wall 24, as shown in FIGS. 6 and 7. In embodiments, apertures 50 are configured to receive a mating tab 38 of another adjacent marking clip 14. Exemplary marking clips 14 of the present disclosure are configured to be stacked onto each other to further distinguish a specific cable 12 from other cables 12. For example, each marking clip 14 may be an injection molded plastic which is dyed to a specific color. A user may have a plurality of red marking clips 14, a plurality of blue marking clips 14, a plurality of yellow marking clips 14, and a plurality of green marking clips 14, for example. If the user has to identify 8 different cables 12, the first cable 12 may have a red marking clip 14 proximate to each end 46 of the first cable 12. A second cable 112 may have a blue marking clip 14 proximate to each end 46 of the second cable 112. A third cable 212 may have a yellow marking clip 14 proximate to each end 46 of the third cable 212. A fourth cable 312 may have a green marking clip 14 proximate to each end 46 of the fourth cable 312. A fifth cable 1112 may have two red marking clips 14, 114 which are stacked against each other proximate to each end 46 of the cable 1112, as shown in FIG. 7. A sixth cable 2112 may have a red marking clip 14 and a blue marking clip 114 which are stacked against each other proximate to each end 46 of the sixth cable 2112, as shown in FIG. 7. A seventh cable 3112 may have a red marking clip 14 and a yellow marking clip 114 which are stacked against each other proximate to each end 46 of the seventh cable 3112, as shown in FIG. 7. An eighth cable 4112 may have a red marking clip 14 and a green marking clip 114 which are stacked against each other proximate to each end 46 of the eighth cable 4112, as shown in FIG. 7. As one can appreciate, there are many varieties and combinations considering three or more marking clips 14 could also be stacked upon each other to create additional combinations. It is understood that marking clip 114 may have a different color from, or the same color as, marking clip 14.

Figure 8:
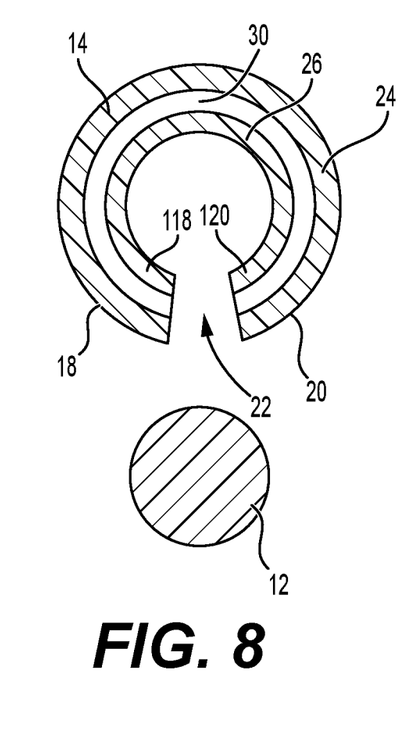
FIG. 8 is a cross-sectional view taken along the section line shown in FIG. 2 prior to positioning the marking clip around a cable.
Figure 9:
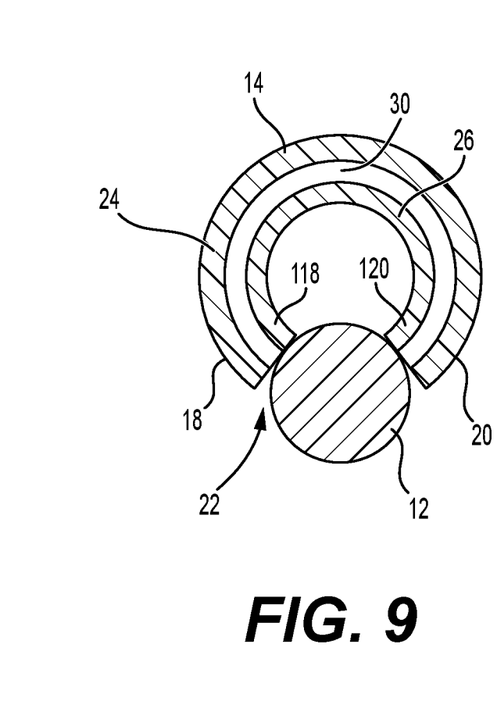
FIG. 9 is a cross-sectional view taken along the section line shown in FIG. 2, during positioning of the marking clip around the cable.
Figure 10:
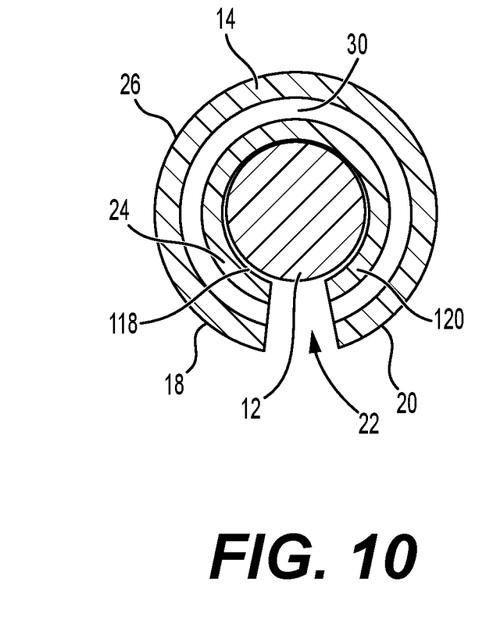
FIG. 10 is a cross-sectional view taken alone the section line shown in FIG. 2, after positioning of the marking clip around the cable.

FIGS. 8-10 are cross-sectional views taken along the section line in FIG. 2 at different points in time during the installation of marking clip 14 onto cable 12. FIG. 8 shows marking clip 14 prior to positioning marking clip 14 around cable 12. FIG. 9 shows marking clip 14 partially installed around cable 12 with cable 12 in opening 22 of marking clip 14. FIG. 10 shows marking clip 14 fully installed on cable 14 with cable 14 positioned in and contacting inner sleeve 26.

As shown in FIGS. 8-10, inner sleeve 26 has a pair of opposed ends 118, 120 that are separated by opening 22. Similarly, outer cylindrical wall 24 has a pair of opposed ends 18, 20 that are separated by opening 22. Ends 18, 20, 118, 120 are disposed so as to provide opening 22 with sufficient width to allow engagement with cable 12 without damaging cable 12. As best seen in FIG. 9, outer cylindrical wall 24 and inner sleeve 26 are configured to flex so as to expand opening 22 between each pair of ends 18, 118, 20, 120 to allow inner sleeve 26 to be positioned substantially circumferentially around cable 12.

While exemplary, non-limiting embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A cable marking clip for securing to a connector portion of a cable such that axial movement of the cable marking clip relative to the connector portion is prevented comprising:
   an outer wall including a first end;
   an inner sleeve including a first end;
   wherein the first end of the inner sleeve is attached to the first end of the outer wall;
   wherein the inner sleeve is positioned radially inside the outer wall;
   wherein the inner sleeve is configured to extend an axial length from its first end;
   wherein the outer wall is configured to extend an axial length from its first end;
   wherein the axial length of the inner sleeve is less than the axial length of the outer wall;
   wherein the outer wall is configured to include an opening that extends an entirety of the axial length of the outer wall;
   wherein the inner sleeve is configured to include an opening that extends an entirety of the axial length of the inner sleeve;
   wherein the opening in the outer wall is configured to permit the outer wall to expand to receive a cable in a radial direction;
   wherein the opening in the inner sleeve is configured to permit the inner sleeve to expand to receive the cable in the radial direction;

wherein the outer wall includes a protrusion that protrudes radially inward;
wherein the outer wall includes a recess that is configured to receive the protrusion of a second one of the cable marking clip so as to enable stacking of cable marking clips; and
wherein the protrusion is configured to engage a recess on a connector having strain relief grooves and the inner sleeve is configured to be received radially between the connector and a cable so as to prevent axial movement of the cable marking clip relative to connectors with and without strain relief grooves.

2. The cable marking clip of claim 1, wherein the inner sleeve is configured to be positioned partially circumferentially around a portion of the cable.

3. The cable marking clip of claim 1, wherein the cable is a fiber optic cable.

4. The cable marking clip of claim 1, wherein an inner surface of the outer wall is configured to contact an outer surface of the connector.

5. The cable marking clip of claim 1, wherein the protrusion includes a plurality of protrusions.

6. The cable marking clip of claim 1, wherein the opening in the outer wall and the opening in the inner sleeve are configured to expand to allow the cable marking clip to be installed on the cable.

7. The cable marking clip of claim 1, wherein the outer wall and the inner sleeve are separated radially by a gap.

8. A cable marking clip for securing to a connector portion of a cable such that axial movement of the cable marking clip relative to the connector portion is prevented comprising:
an outer portion including a first end portion;
an inner portion including a first end portion;
wherein the first end portion of the inner portion is attached to the first end portion of the outer portion;
wherein the outer portion has an opening that extends an entirety of the axial length of the outer portion;
wherein the inner portion has an opening that extends an entirety of the axial length of the inner portion; and
wherein the outer portion is configured to engage a recess on the connector portion having strain relief grooves and the inner portion is configured to be received radially between the connector portion and the cable so as to prevent axial movement of the cable marking clip relative to connector portions with and without strain relief grooves.

9. The cable marking clip of claim 8, wherein the inner portion is positioned radially inside the outer portion.

10. The cable marking clip of claim 8, wherein the inner portion is configured to extend an axial length from its first end portion.

11. The cable marking clip of claim 10, wherein the outer portion is configured to extend an axial length from its first end portion.

12. The cable marking clip of claim 11, wherein the axial length of the inner portion is less than the axial length of the outer portion.

13. The cable marking clip of claim 8, wherein the outer portion includes a protruding portion that protrudes radially inward.

14. The cable marking clip of claim 13, wherein the outer portion includes a receiving portion that is configured to receive the protruding portion of a second one of the cable marking clip.

15. The cable marking clip of claim 13, wherein the protruding portion is configured to engage a recess on the connector portion to prevent axial movement of the cable marking clip relative to the connector portion.

16. The cable marking clip of claim 8, wherein the inner portion is configured to be positioned between the cable and the connector portion connected to the cable.

17. The cable marking clip of claim 8, wherein the outer portion and the inner portion are separated radially by a gap.

18. The cable marking clip of claim 8, wherein the inner portion is configured to be positioned substantially circumferentially around the cable.

19. The cable marking clip of claim 8, wherein the outer portion is configured to cover the proximate end of the connector portion.

20. A cable marking clip for securing to a connector of a cable such that axial movement of the cable marking clip relative to the connector is prevented comprising:
an outer portion;
an inner portion attached to the outer portion at an end; and
wherein the outer portion is configured to engage a connector having strain relief grooves and the inner portion is configured to be received radially between the connector and a cable so as to prevent axial movement of the cable marking clip relative to connectors with and without strain relief grooves; and
wherein the inner portion is configured to be positioned between the cable and the connector.

21. The cable marking clip of claim 20, wherein the inner portion is positioned radially inside the outer portion.

22. The cable marking clip of claim 20, wherein the inner portion is shorter in an axial direction than the outer portion.

23. The cable marking clip of claim 20, wherein the outer portion has an opening that extends an entirety of an axial length of the outer portion.

24. The cable marking clip of claim 20, wherein the inner portion has an opening that extends an entirety of an axial length of the inner portion.

25. The cable marking clip of claim 20, wherein the outer portion is an outer wall that extends in an axial direction.

26. The cable marking clip of claim 25, wherein the inner portion is an inner sleeve that extends in the axial direction.

27. The cable marking clip of claim 20, wherein the outer portion includes a protruding portion that protrudes radially inward.

28. The cable marking clip of claim 27, wherein the outer portion includes a receiving portion that is configured to receive the protruding portion of a second one of the cable marking clip.

29. The cable marking clip of claim 27, wherein the protruding portion is configured to engage a recess on the connector to prevent axial movement of the cable marking clip relative to the connector.

30. The cable marking clip of claim 20, wherein the inner portion and the outer portion comprises a single monolithic structure of unitary construction.

* * * * *